United States Patent
Acharya et al.

(10) Patent No.: US 10,679,065 B2
(45) Date of Patent: Jun. 9, 2020

(54) NON-INVASIVE DATA EXTRACTION FROM DIGITAL DISPLAYS

(71) Applicant: Hitachi, Ltd., Tokyo (JP)

(72) Inventors: Joydeep Acharya, Milpitas, CA (US); Satoshi Katsunuma, Santa Clara, CA (US); Sudhanshu Gaur, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 226 days.

(21) Appl. No.: 16/026,499

(22) Filed: Jul. 3, 2018

(65) Prior Publication Data
US 2020/0012860 A1   Jan. 9, 2020

(51) Int. Cl.
*G06G 5/00* (2006.01)
*G06K 9/00* (2006.01)
*G06K 9/32* (2006.01)
*G06K 9/80* (2006.01)

(52) U.S. Cl.
CPC ..... *G06K 9/00718* (2013.01); *G06K 9/00476* (2013.01); *G06K 9/3258* (2013.01); *G06K 9/80* (2013.01); *G06K 2209/01* (2013.01)

(58) Field of Classification Search
USPC ....... 382/100, 103, 106, 155, 162, 168, 170, 382/181, 203, 214, 219, 224, 254, 274, 382/276, 285–291, 292, 317, 113; 386/230; 345/443, 689
See application file for complete search history.

(56) References Cited

U.S. PATENT DOCUMENTS

| | | | |
|---|---|---|---|
| 9,332,229 B2* | 5/2016 | Ishimoto | E02F 9/226 |
| 2013/0071085 A1* | 3/2013 | Ryman | H04N 5/783 |
| | | | 386/230 |
| 2014/0176562 A1* | 6/2014 | Somerfield | G06T 11/203 |
| | | | 345/443 |
| 2017/0223261 A1* | 8/2017 | Shimizu | G06K 9/00335 |
| 2018/0075235 A1* | 3/2018 | Tajima | G06F 21/554 |
| 2019/0104284 A1* | 4/2019 | Phillips | H04N 7/185 |

OTHER PUBLICATIONS

Tesseract OCR, opensource.google.com, downloaded Jun. 19, 2018 from https://opensource.google.com/projects/tesseract.

\* cited by examiner

*Primary Examiner* — Seyed H Azarian
(74) *Attorney, Agent, or Firm* — Procopio, Cory, Hargreaves & Savitch LLP

(57) ABSTRACT

Example implementations described herein are directed to systems and methods for non-invasive data extraction from digital displays. In an example implementation, a method includes receiving one or more video frames from a video capture device capturing an external display, where the external display is independent the video capture device; determining one or more locations within the external display comprising time varying data of the external display; and for each identified location of the time varying data: determining a data type; applying one or more rules based on the data type; and determining an accuracy of the time varying data within the one or more frames based on the rules.

17 Claims, 9 Drawing Sheets

20

30

701

| Parameters | Value |
|---|---|
| Data Type Name | STRING |
| Data Bounding Box | [FLOAT, FLOAT, FLOAT, FLOAT] |
| Text Color | STRING |
| Background Color | STRING |

702

| Parameters | Value |
|---|---|
| Data Type Name | TEMPERATURE |
| Data Bounding Box | [3.35, 10.37, 9.5, 2.1] |
| Text Color | #98C234 |
| Background Color | #312C2B |

FIG. 7

NON-INVASIVE DATA EXTRACTION FROM DIGITAL DISPLAYS

BACKGROUND

Field

The present disclosure relates generally to non-invasive data extraction, and more specifically, to non-invasive data extraction for digital displays.

Related Art

Industrial controllers generally generate a complex display of Operational Technology (OT) data that are digitally displayed. Related art approaches that do connect industrial controllers to an IT network for extraction of data are susceptible to unauthorized access or security breaches (e.g., a computer virus or malware) that can leak data, damage equipment, or cause real world safety concerns. Further, industrial controllers that do connect to an IT network typically need non-trivial expertise and expensive customization of legacy programming for the controllers to implement data extraction.

Typically, existing and legacy industrial controllers maintain the OT data locally in insolated controller systems due to the expense and security reasons. Factory owners are generally averse to linking controllers to an IT network in fear of losing control of the industrial equipment. However, such isolated systems prevent OT data from being readily available for analysis and integration with other systems.

SUMMARY

An example implementation includes a method for non-invasive data extraction that includes receiving one or more video frames from a video capture device capturing an external display, where the external display is independent of the video capture device; determining one or more locations within the external display comprising time varying data of the external display; and for each identified location of the time varying data: determining a data type; applying one or more rules based on the data type; and determining an accuracy of the time varying data within the one or more frames based on the rules.

Aspects of the present disclosure can include a system with a memory and processing device configured for non-invasive data extraction that receives one or more video frames from a video capture device capturing an external display, where the external display is independent of the video capture device; determine one or more locations within the external display comprising time varying data of the external display; and for each identified location of the time varying data: determining a data type; applying one or more rules based on the data type; and determining an accuracy of the time varying data within the one or more frames based on the rules.

Aspects of the present disclosure can include a non-transitory computer readable medium storing instructions for non-invasive data extraction that receives one or more video frames from a video capture device capturing an external display, where the external display is independent of the video capture device; determine one or more locations within the external display comprising time varying data of the external display; and for each identified location of the time varying data: determining a data type; applying one or more rules based on the data type; and determining an accuracy of the time varying data within the one or more frames based on the rules.

Aspects of the present disclosure can include a means for non-invasive data extraction that includes means for receiving one or more video frames from a video capture device capturing an external display, where the external display is independent of the video capture device; means for determining one or more locations within the external display comprising time varying data of the external display; and for each identified location of the time varying data: means for determining a data type; means for applying one or more rules based on the data type; and means for determining an accuracy of the time varying data within the one or more frames based on the rules.

BRIEF DESCRIPTION OF DRAWINGS

FIG. 7 illustrates example tables of sample specification forms in accordance with an example implementation.

DETAILED DESCRIPTION

Figure 1:
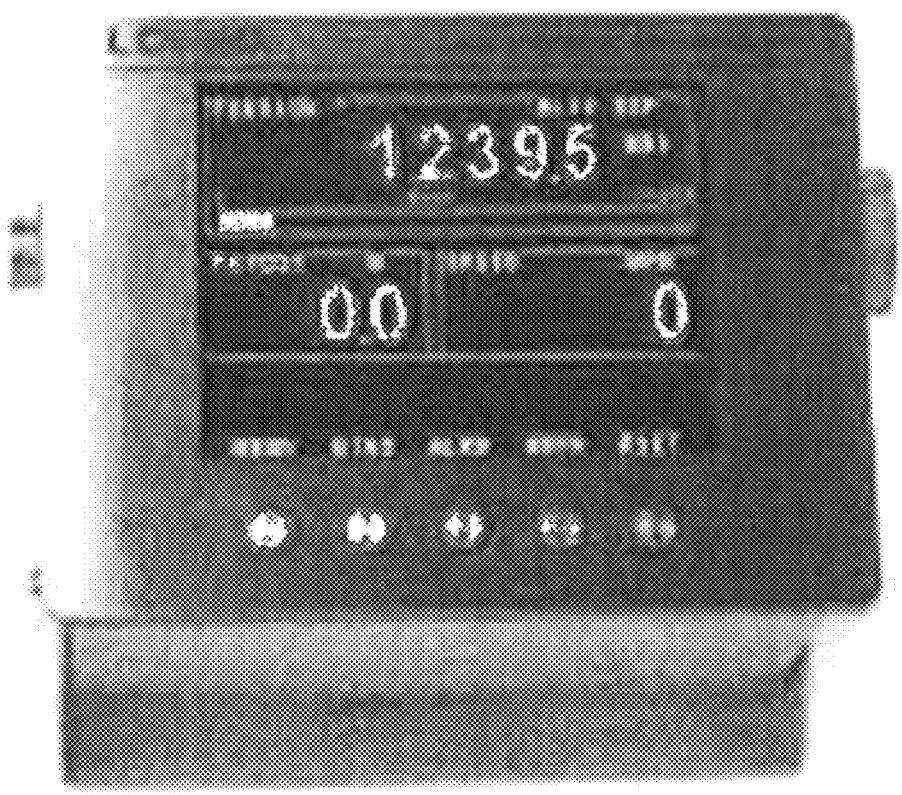
FIG. 1 illustrates an example digital display in accordance with example implementations.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Extracting data from millions of sensors and devices is a key requirement for industrial Internet of Things (IIoT). Since legacy devices may not be connected to any networked system due to security concerns or are operated by customized software, extracting data from such systems can require laborious and expensive custom solutions. Typically IIoT and/or manufacturing machines (e.g., Programmable Logic Controller (PLCs), Computer Numerical Control (CNCs), etc.) include a digital display for operators which have time varying data displayed in dedicated user interfaces (UI) but that data can't be stored in a database or subsequently ingested into an analytics or visualization software. Further, complex digital displays for operators commonly display information in multiple regions and present the information in a variety formats (e.g., numerically, text-based, graphically, color-based, etc.).

Aspects of the present disclosure are directed to a non-invasive data extraction framework for information (metadata and variable time series data values) from digital displays found in manufacturing environments. The non-invasive data extraction systems and method described herein use image capture devices (e.g., a camera) to extract the information from displays that independent of and external to the image capture devices. Example aspects of the present disclosure include the non-invasive data extraction system that is compatible with digital displays of legacy machines, provides secure capture and delivery of real-time operational data without compromising security of the originating manufacturing equipment (e.g., the industrial controller), and enhances the availability and accuracy of analytics for such manufacturing equipment. For example, the non-invasive data extraction systems and method described herein greatly enhance accuracy of data extracted from external systems that display data with improved data processing and error correction that can be used with subsequent analytics. The extraction is non-invasive and thus is very easy to deploy and poses no security risks associated with traditional methods of data extraction by connecting the machine to a network.

FIG. 1 illustrates an example digital display 10 in accordance with example implementations. Related art approaches to extract data from analog displays take an image of an analog dial and calibrate to obtain its value. However, related art approaches are not compatible with digital displays 10 due to more complex presentations with the different types of information. For example, digital displays 10 for controller typically include static metadata and time varying data series. Related art approaches attempt to apply traditional Optical Character Recognition (OCR) to read digital images. However, related art OCR approaches fail to effectively and accurately process a stream of different types of information from a digital display 10 of a controller.

Figure 2:
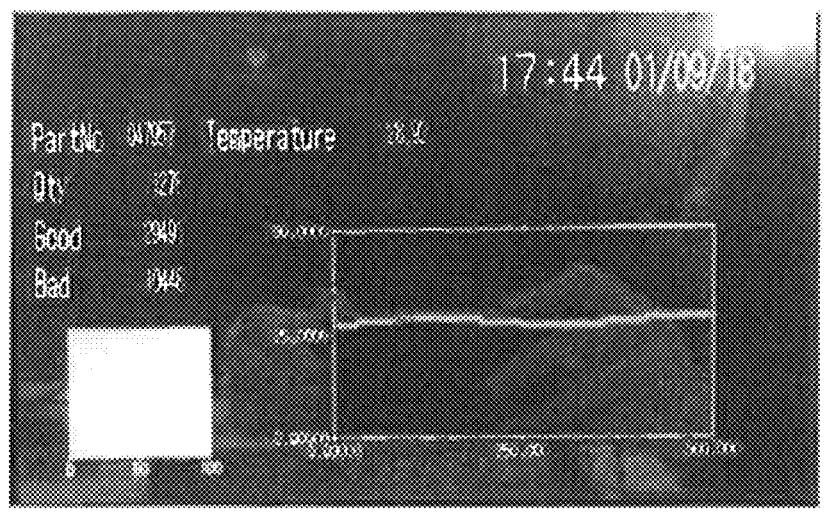
FIG. 2 illustrates another example digital display in accordance with example implementations.
Figure 2:
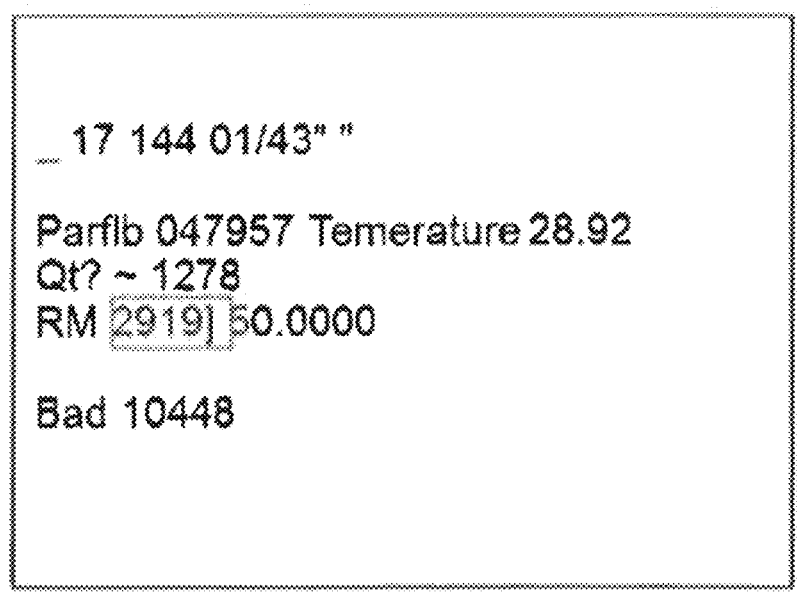

FIG. 2 illustrates an example digital display 20 and a related art data traditional OCR output 30 example. FIG. 2 shows a snapshot of an example digital display 20 and output 30 of a related art OCR implementation. In the example, some static numbers (e.g., 17 144 01/43) are recognized but the related art OCR approaches face difficulty in accurately associating the values and recognizing text values. In the example, the recognized values are unformatted and the text values 'PartNo', 'Qty', 'Good' are all misspelt. Further, traditional OCR approaches can extract a value from the graph to associate with 'Good' since it is graphically depicted on an x/y axis where the y-axis label '50.0' on the display near the graph. Some related art OCR approaches can be designed for displays with simplistic information (e.g., a single region with a value) or customized for a well-defined image. However, digital displays for operators commonly include time varying information in multiple regions and in a variety of formats (e.g., numerically, text-based, graphically, color-based, etc.).

According to example implementations described herein, a complex digital display can present a variety of information that includes static metadata and time varying data in multiple regions. Example implementation of the present disclosure includes data extraction processing and error handling modules for reading data from digital displays that are compatible for use with existing OCR techniques.

Example implementations described herein are direct to a non-invasive solution in which data is presented by a digital display of a controller, and an external camera extracts the data without connecting to the controller to an IT network. An example aspect captures a video image of the controller display at a given time and subsequently performs video analytics to recognize the data on the display. Multiple regions of a display can be identified to determine a 'topology' of a digital display as a static or dynamic layout that can be intelligently used for data recognition and extraction.

An example aspect of the present disclosure includes image process, for example, to trim information (e.g., 'PartNo', 'Qty', 'Good', 'Bad', etc.) from a main image and input to an OCR module as further described in reference to FIGS. 3-9. Further, the camera can monitor the external digital display to provide real-time extraction of data. The non-invasive extraction module can analyze the external digital display and identify different types metadata as static and variable time series values. For example, in external display 20, the non-invasive extraction module can identify the texts 'PartNo', 'Qty', 'Good' and 'Bad' as static metadata that do not change frequently compared to time varying data such as the temperature value, graphical depiction, time stamp, etc. Accordingly, after a topology of the external display is determined, the non-invasive extraction module can efficiently monitor and extract time varying data that is associated with static data.

Figure 3:
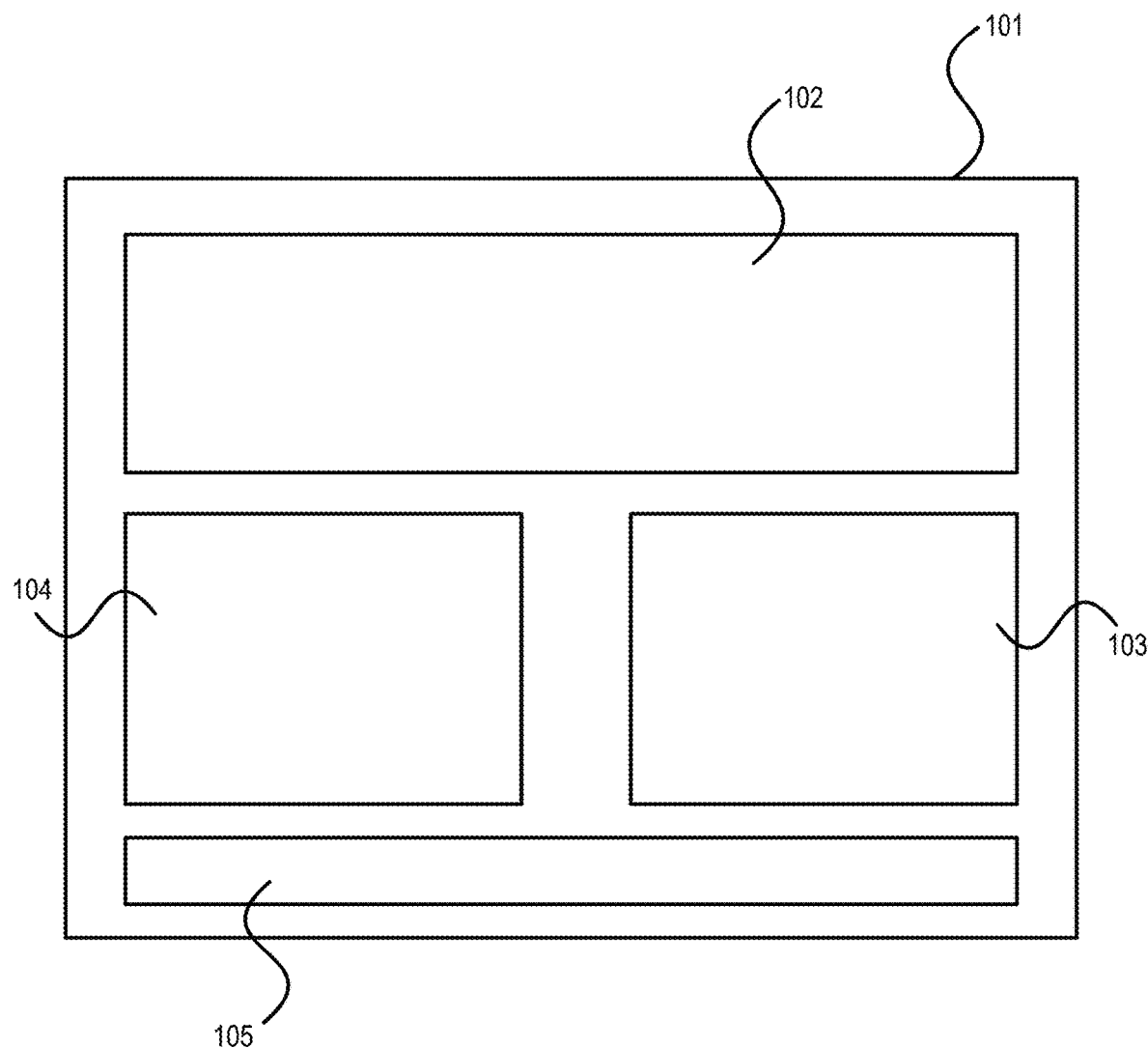
FIG. 3 illustrates example digital display typology in accordance with an example implementation.

FIG. 3 illustrates example digital display topology in accordance with an example implementation. In FIG. 3, an area of a digital display 101 can be divided into several sections and/or regions as indicated by 102, 103, 104 and 105 based on contents of each section and/or region. Complex digital display for industrial applications can include a great deal information for different contexts. In an example, the digital display can have different sections directed to different component or elements where section 102 is for an input feeder, section 103 is for machine health, section 104 is an alarm readout, and section 105 is an output tracker. Each section 102, 103, 104 and 105 can include different types of data (e.g., static metadata, time varying data) in different formats (e.g., text, numerical, graphical, color-based, etc.).

Figure 4:
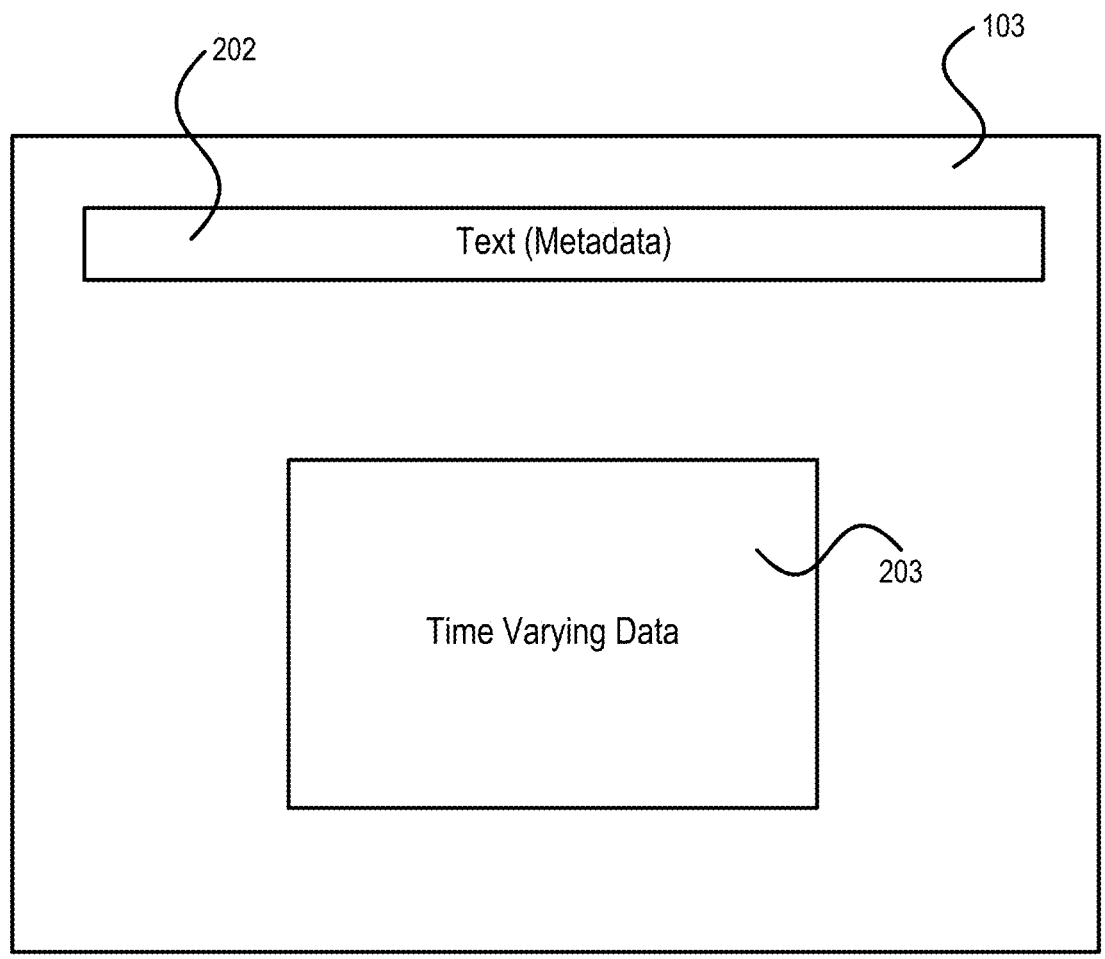
FIG. 4 illustrates an example digital display in accordance with an example implementation.

FIG. 4 illustrates an example digital display in accordance with an example implementation. As illustrated in FIG. 4, section 103 can be analyzed to identify further divisions of a spatial region 202 with static metadata and a spatial region 203 with time varying data. The contents displayed in spatial region 202 may be identified relative to spatial region 203 based on the frequency of change. For example, the spatial region 202 can display static metadata is a string of text indicating a data label, a data type, or a context of other data displayed spatially nearby in spatial region 203. For example, the static metadata of spatial region 202 can be 'TEMPERATURE' or 'TEMP' or 'PRESSURE' the displayed information in spatial region 203 can be identified as time varying data. It should be noted that static metadata may change from time to time but at a less frequent rate than time varying data.

Figure 5:
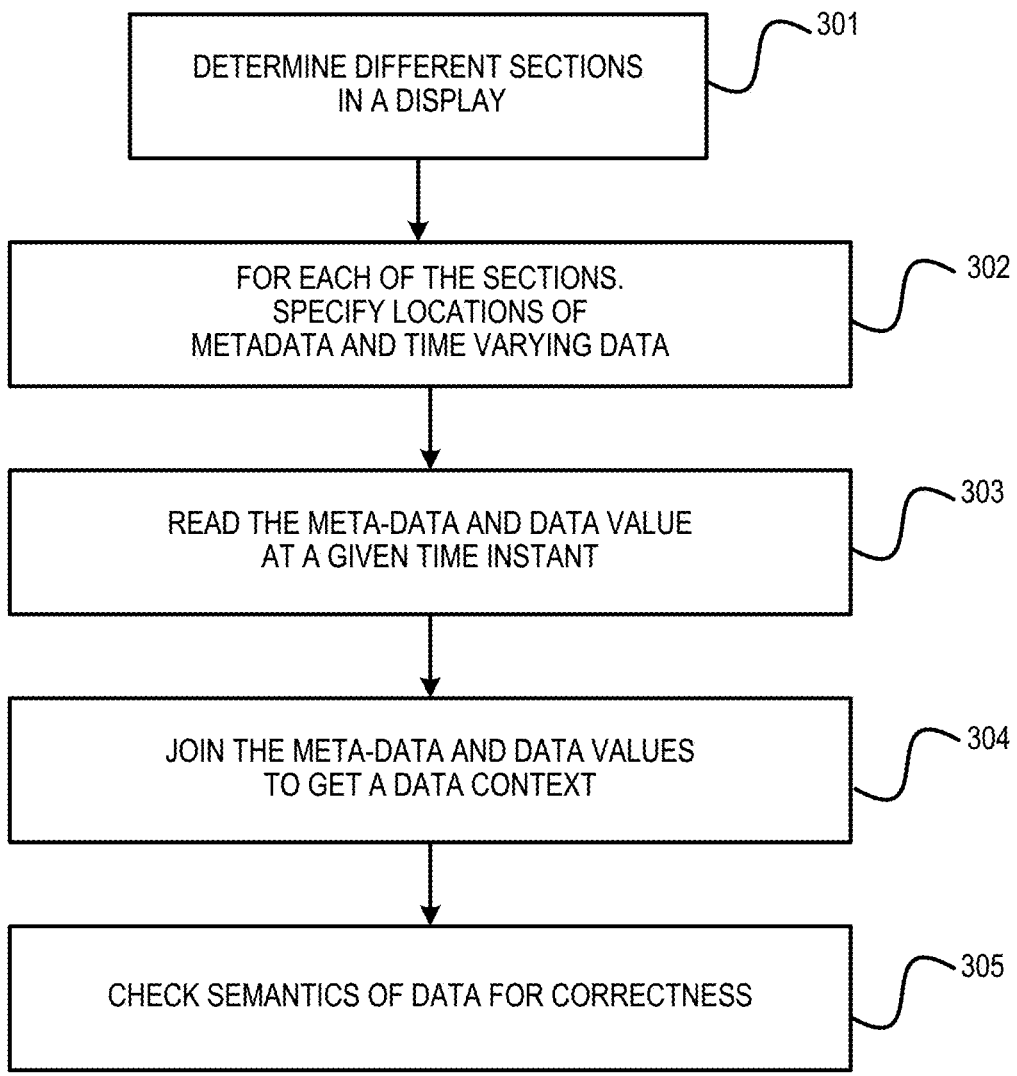
FIG. 5 illustrates a flow diagram of an example non-invasive data extraction process in accordance with an example implementation.

FIG. 5 illustrates a flow diagram of an example non-invasive data extraction process in accordance with an example implementation. In an example implementation, the non-invasive data extraction process receives one or more video frames from a video capture device capturing an external display, where the external display is independent the video capture device.

The non-invasive data extraction process determines one or more locations within the external display comprising time varying data of the external display. At 301, the process determines different sections (e.g., section 102, 103, 104 and 105 of FIG. 3) present in an external display. At 302, for each section, the process defines one or more regions of metadata in spatial region 202 and time varying data in spatial region 203. The process leverages techniques to specify locations including video frame comparisons and analysis to enhance results with user input and error correction feedback. In an example, at 302, specifying the location of data within a section can allow a user to input the static metadata in a display which in turn improves the performance of reading the actual time varying data series. Location information is used to determine the topology with a section layout that improves performance of recognition through OCR.

At 303, the process reads the metadata value in spatial region 202 based on the determined topology and can include manual input. For each instant of time, the process applies OCR to read the value of the time varying data in spatial region 203. At 304, the process joins the time varying data in spatial region 203 (e.g., 99, 100, 101, est.) with the metadata (e.g., FAHRENHEIT) in a section to assign a context to the information being extracted from the display (e.g., 100 FAHRENHEIT indicates that temperature is being stored). At 305, the process checks the associated data for semantic correctness. For example, if the metadata is 'KILOGRAMS', then semantic rules for weight can be applied to detect that the time varying data values are non-negative. In an example, if at 303 the process detects a negative value, a semantic error can trigger reassessment of the context at 304, request user input, trigger an alarm, etc. At 305, a semantic overlay layer is applied over an OCR layer to improve the recognition. The semantic rule checking at 305 improves the performance of reading a time series of data by incorporating the statistics and temporal correlations of the data series. In contrast, a traditional OCR will attempt to recognize each value of the time series as independent readings which may be less accurate.

Figure 6:
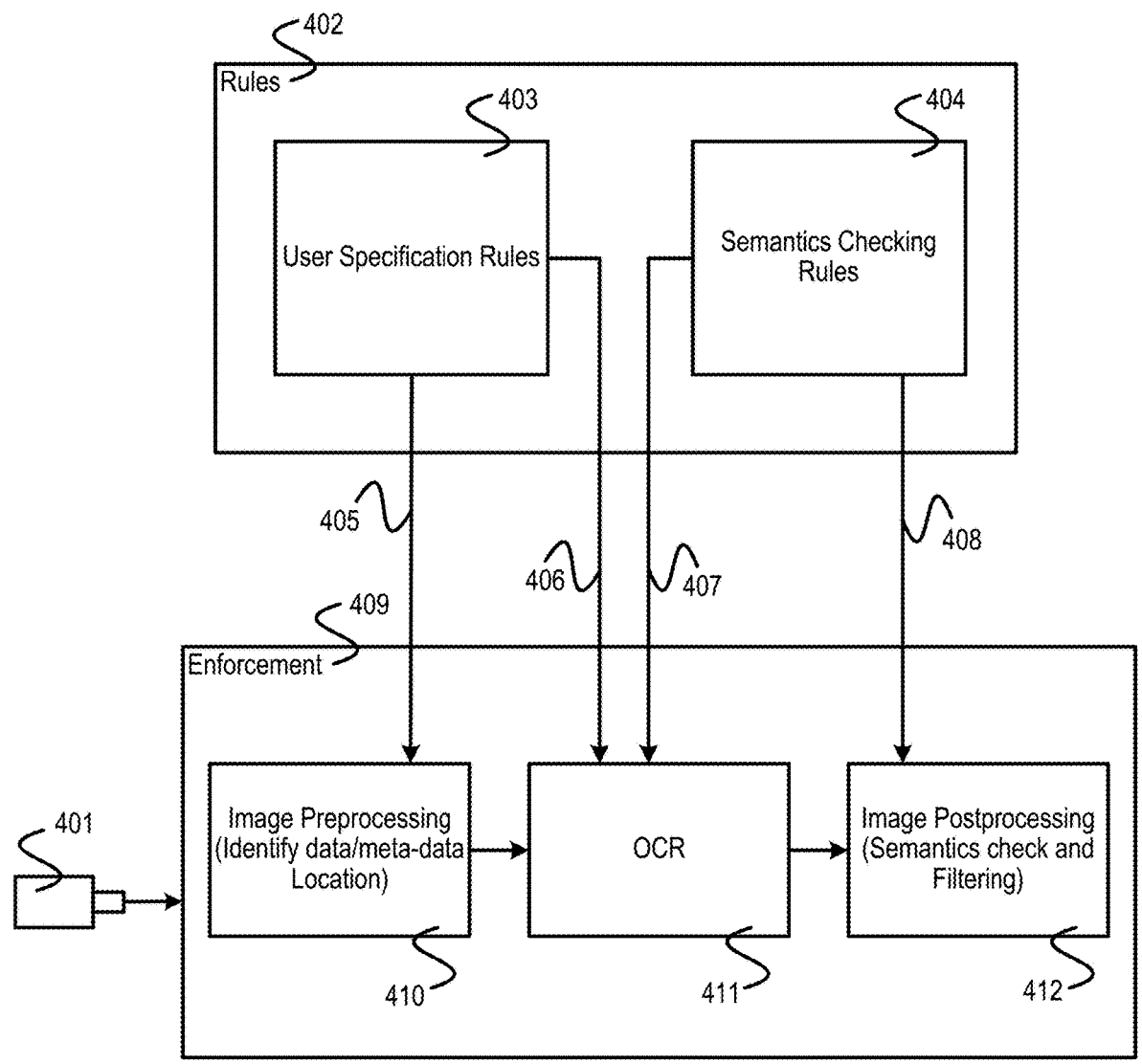
FIG. 6 illustrates an example non-invasive data extraction system in accordance with an example implementation.

FIG. 6 illustrates an example non-invasive data extraction system in accordance with an example implementation. In an example implementation, the non-invasive data extraction system 400 can include a camera 401, a rules module 402, and an enforcement module 409. The enforcement module 409 can receive image data from the camera 401 and be operatively coupled to the rules module 402 to non-invasively extract data and perform analytics.

The enforcement module 409 includes an image preprocessing module 410, OCR module 411, and image post-processing module 412. At image preprocessing module 410 performs image capture calibration and video frame analysis (e.g., cropping, resolution, focus, color, sharpness, etc.). For example, the preprocessing module 410 can trim or crop the image down based on inputs from the user specification rules module 403. OCR module 411 can apply basic or custom OCR techniques using information from the semantic rule checking module 404. According to an example implementation, the OCR module 411 can recognize subsequent values in a data series using their statistics and temporal correlations. Image post-processing module 412 can implement one or more actions based on rules in the results from the semantic rule checking module 404.

Rules module 402 makes the rules for digital data extraction and enforcement module 409 takes the rules and implements preprocessing and post-processing using an OCR algorithm. The rules module 402 includes a user specification rules module 403 as described in reference to FIG. 7 and a semantic rule checking module 404 as described in reference to FIG. 8. The rules module 402 can be used with custom and/or pre-existing OCR operations.

The user specification rules module 403 specifies the various metadata that are present in the digital display sections that can include information about types of the data (e.g., temperature, weight, etc.) and location (inside the display) of the data panel. The user specification rules module 403 can further include other or additional information such as color of text and background to improve the performance of the OCR operations, as described in reference to FIG. 7. The semantic rule checking module 404 checks for semantic correctness of the data as described further in reference to FIG. 8.

At 405, the process provides input from the user specification rules module 403 to the image preprocessing module 410 in the enforcement module 409. The image preprocessing module 410 utilizes the user specification rules module 403 to determine locations within the display to define as sections and/or regions that are processed by the OCR module 411.

At 406, the process provides additional input from the user specification rules module 403 to the OCR module 411 directly so that information of the text and background colors can be used by the OCR module 411 to help improve recognition performance.

In an example implementation, feedback from the semantic rule checking module 404 can be used with the OCR module 411 to determine a confidence value of the recognition.

In an example implementation involving advanced OCR techniques, the process can provide the further input from the semantic rule checking module 404 to the OCR module 411 for advanced OCR processing at 407. The further input provides logic checking to better recognize the information from the external display, for example consecutive values in a data series by factoring in their temporal correlation directly.

Figure 8:
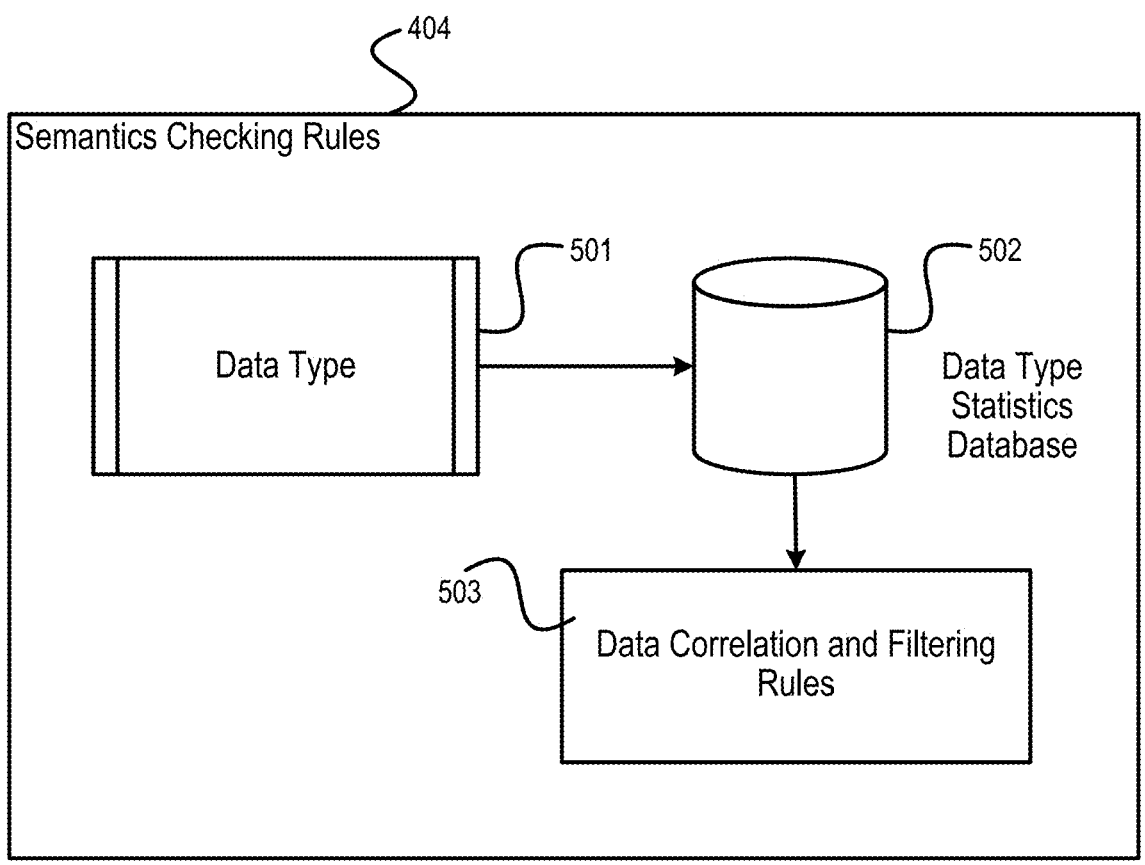
FIG. 8 illustrates an example semantic checking rules module in accordance with an example implementation.

At 408, the process provides the input from the semantic rule checking module 404 to the image post-processing module 412 to apply data filtering and corrections rules as described further in reference to FIG. 8. Accordingly, the enforcement module 409 can determine an accuracy of the time varying data within the one or more frames based on the rules.

FIG. 7 illustrates example tables of sample specification forms in accordance with an example implementation. In an example implementation, a display can include a data bounding box of the format [x y w h] where (x,y) is the coordinate of the top left part of the bounding box that contains the data and (w, h) are the width and height of the bounding box.

In table 701, the example implementation shows an example format of the user specification form. For example, the user specification form table format shows a parameters format as a value format, data type name can indicate a STRING format, data bounding box can indicate a format of [FLOAT, FLOAT, FLOAT, FLOAT], text color can indicate a STRING format, and background color can indicate a STRING format.

Table 702 shows user specification form table with sample values. For example, the parameters can be indicates as values, data type name can indicate temperature, data bounding box can indicate a values of [3.35, 10.37, 9.5, 2.1], text color can be #98C234 color value, and background color can be a #312C2B color value.

FIG. 8 illustrates an example semantic rule checking module 404 in accordance with an example implementation. In an example implementation, semantic rule checking module 404 uses input of a data type 501, a data type statistics database 502, and data correlations and filtering rules module 503 with the OCR module 411 and image post-processing module 412 of FIG. 6. In an example implementation, a form from the user specification rules module 403 can specify a data type (e.g., temperature, weight, etc.) associated with a location on the external display.

The data type statistics database 502 stores statistics and temporal correlation for different types of data series with a data type as the key. For example, if metadata is 'count', then a sequence is either monotonically increasing or possibly periodically resets to zero and other data series may have maximum or minimum values that can form part of the statistics. Based on the statistics of the data series from data type statistics database 502, the data correlations and filtering rules module 503 can define rules to filter and correct the output of the OCR module 411 when an anomaly is detected. For example, if metadata is 'count', the OCR reading at time 't' is 109, and 't+1' is '100', then a heuristic rule can be used to correct the data (e.g., by extrapolating count(t+1) from the last 5 samples, count(t−4) to count(t)). If the quantity that is being displayed has max/min values and reported OCR value is outside this range, then the data correlations and filtering rules module 503 can apply the heuristic algorithm to cap the data accordingly.

In an example implementation, semantic checking and filtering can apply rules from a databased for different types of content that are presented on a digital display. The rules for semantic checking and filtering can be assembled from general knowledge context rules and pre-programmed based on specific domain knowledge. For example, a digital display can present content with a particular datatype (e.g., a temperature, pressure level, graphical rendering, etc.) and a rule for the datatype can be applied to check the values being displayed (e.g., extreme temperature, dangerous pressure, negative trending graph, etc.). The semantics checking and filtering can be used for improved image recognition (e.g., reading of the digital display to associate related data with proper regions and labels) as well as provide alerts or alarms for real-time non-invasive data extraction of the digital display. The semantics checking and filtering can be applied to verify that content being recognized is accurate and can detect when values of the content are abnormal (e.g., outside of a normal range, trend, interval, etc.). Accordingly, the non-invasive data extraction process can provide intelligent access to content from a digital display, where the digital display is disconnected or without any connection to a network or remote communication means. The semantic checking and filtering aspects of the non-invasive data extraction process provides intelligent processing and handling of the extracted content from the digital display.

Figure 9:
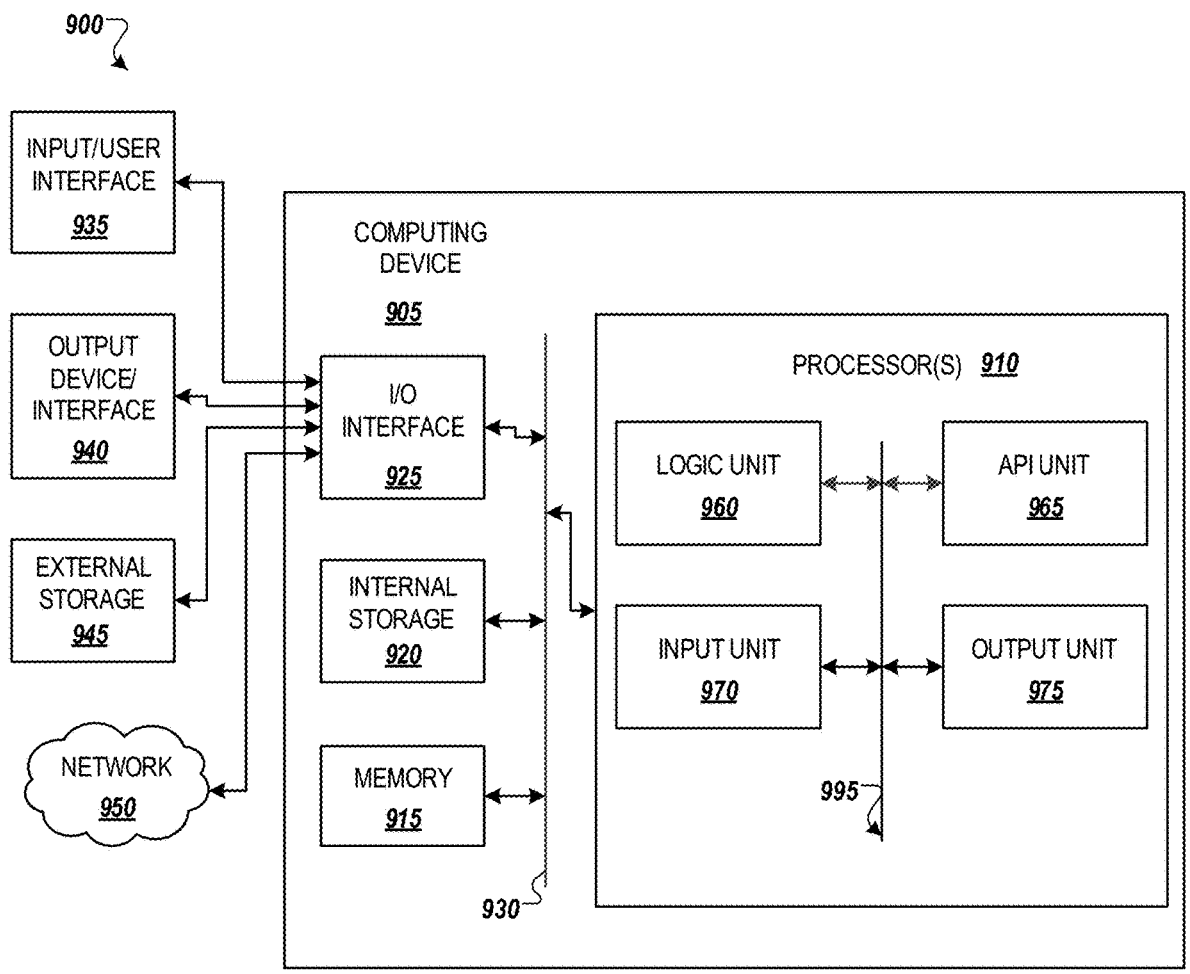
FIG. 9 illustrates an example computing environment with an example computer device suitable for use in some example implementations.

FIG. 9 illustrates an example computing environment 900 with an example computer device suitable for use in some example implementations, such as for facilitating a system for non-invasive data extraction from digital displays illustrated in FIGS. 3-8. Computer device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computer device 905.

Computer device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via I/O interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, input unit 970, output unit 975, in some example implementations described above. For example, the flow of one or more processes or implementations may be controlled by logic unit 960 alone or in conjunction with API unit 965.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "determining" "receiving," "applying," "outputting," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The processor 910 is configured to receive one or more video frames from a video capture device capturing an external display, where the external display is independent the video capture device as illustrated in FIG. 6 at 401. In an example implementation, the processor 910 is configured to perform image preprocessing including at least one of cropping, content color adjustment, background color adjustment, and resolution adjustment as illustrated in FIG. 6 at 410.

The processor 910 is configured to determine one or more locations within the external display comprising time varying data of the external display as illustrated in FIG. 3 at 102, 103, 104, and 105, FIG. 4 at 203, FIG. 5 at 301, 302, 303, 304, and FIGS. 6 at 410 and 403. For each identified location of the time varying data the processor 910 is configured to determine a data type as illustrated in FIG. 4 at 203, FIG. 5 at 301, 302, FIG. 6 at 410, and FIG. 7 at 701 and 702. In an example implementation, the processor 910 is configured to further determine metadata associated with the external display comprising at least one of a parameter type, a data bounding area, a text color, and a background color and joins the time varying data and the metadata based on the location within the external display as illustrated in FIG. 5 at 303 and 304, FIG. 6 at 403, 404, and 410, and FIG. 7 at 701 and 702.

For each identified location of the time varying data the processor 910 is configured to apply one or more rules based on the data type; and determining an accuracy of the time varying data within the one or more frames based on the rules as illustrated in FIG. 5 at 305, FIG. 6 at 404, and FIG. 8 at 404. In an example implementation, the processor 910 is configured to further calculate a confidence value for the accuracy of the time varying data based on the rule in view of a value of the time varying data as illustrated in FIG. 6 at 412 and FIG. 8 at 503. In an example implementation, a confidence interval is determined from applying one or more rules based on the data type using image post-processing such as semantics checking and filtering such that for each of the identified locations of the time varying data includes further calculating a confidence value for the accuracy of the time varying data based on the rule in view of a value of the time varying data.

In an example implementation, the processor 910 is configured to feed the time varying data to a database that can be used to track the time varying data to perform statistical analysis as illustrated in FIG. 8 at 502 and 503. In an example implementation, the processor 910 is configured to perform image post-processing including at least one of semantics checking and filtering as illustrated in FIG. 6 at 412.

Through the example implementations described herein, a capture device such as a camera can capture an external display of legacy devices that may not be connected to any networked system or are operated by customized software and cannot provide data to the cloud or a management server through the desired communication protocol. Such example implementations further allow for devices to operate externally from the network while facilitating the capture of data from such devices without subjecting such devices to external hacking or intrusion.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:
receiving one or more video frames from a video capture device capturing an external display, wherein the external display is independent the video capture device;
determining one or more locations within the external display comprising time varying data of the external display;
for each identified location of the time varying data:
determining a data type;
applying one or more rules based on the data type; and
determining an accuracy of the time varying data within the one or more frames based on the rule;
wherein for each of the identified locations of the time varying data, calculating a confidence value for the accuracy of the time varying data based on the rule in view of a value of the time varying data.

2. The method of claim 1, wherein for each of the identified locations of the time varying data, further determining metadata associated with the external display comprising at least one of a parameter type, a data bounding area, a text color, and a background color.

3. The method of claim 2, further comprising joining the time varying data and the metadata based on the location within the external display.

4. The method of claim 1, wherein determining the one or more locations further comprises image preprocessing including at least one of cropping, content color adjustment, background color adjustment, and resolution adjustment.

5. The method of claim 1, wherein applying one or more rules based on the data type further comprises image post-processing including at least one of semantics checking and filtering.

6. The method of claim 1, further comprising feeding the time varying data to a database that can be used to track the time varying data to perform statistical analysis.

7. A system comprising:
a memory; and
a processing device configured to:
receive one or more video frames from a video capture device capturing an external display, wherein the external display is independent the video capture device;
determine one or more locations within the external display comprising time varying data of the external display;
for each identified location of the time varying data:
determine a data type;
apply one or more rules based on the data type; and
determine an accuracy of the time varying data within the one or more frames based on the rule;
wherein for each of the identified locations of the time varying data, the processor is further configured to calculate a confidence value for the accuracy of the time varying data based on the rule in view of a value of the time varying data.

8. The system of claim of claim 7, wherein for each of the identified locations of the time varying data, the processor is further configured to determine metadata associated with the external display comprising at least one of a parameter type, a data bounding area, a text color, and a background color.

9. The system of claim of claim 8, further comprising joining the time varying data and the metadata based on the location within the external display.

10. The system of claim of claim 7, wherein the processor is configured to determine the one or more locations through image preprocessing including at least one of cropping, content color adjustment, background color adjustment, and resolution adjustment.

11. The system of claim of claim 7, wherein the processor is configured to apply one or more rules based on the data type through image post-processing including at least one of semantics checking and filtering.

12. The system of claim of claim 7, wherein the processor is further configured to feed the time varying data to a database that can be used to track the time varying data to perform statistical analysis.

13. A non-transitory computer-readable medium storing instructions for a policy based network application management system, the instructions executed by a processing device, the instructions comprising:
receiving one or more video frames from a video capture device capturing an external display, wherein the external display is independent the video capture device;
determining one or more locations within the external display comprising time varying data of the external display;
for each identified location of the time varying data:
determining a data type;
applying one or more rules based on the data type; and
determining an accuracy of the time varying data within the one or more frames based on the rule;
wherein for each of the identified locations of the time varying data, calculating a confidence value for the accuracy of the time varying data based on the rule in view of a value of the time varying data.

14. The non-transitory computer-readable medium of claim 13, further comprising, for each of the identified locations of the time varying data, determining metadata associated with the external display comprising at least one of a parameter type, a data bounding area, a text color, and a background color.

15. The non-transitory computer-readable medium of claim 14, further comprising joining the time varying data and the metadata based on the location within the external display.

16. The non-transitory computer-readable medium of claim 13, wherein the determining the one or more locations further comprises image preprocessing including at least one of cropping, content color adjustment, background color adjustment, and resolution adjustment.

17. The non-transitory computer-readable medium of claim 13, further comprising feeding the time varying data to a database that can be used to track the time varying data to perform statistical analysis.

* * * * *